UNITED STATES PATENT OFFICE.

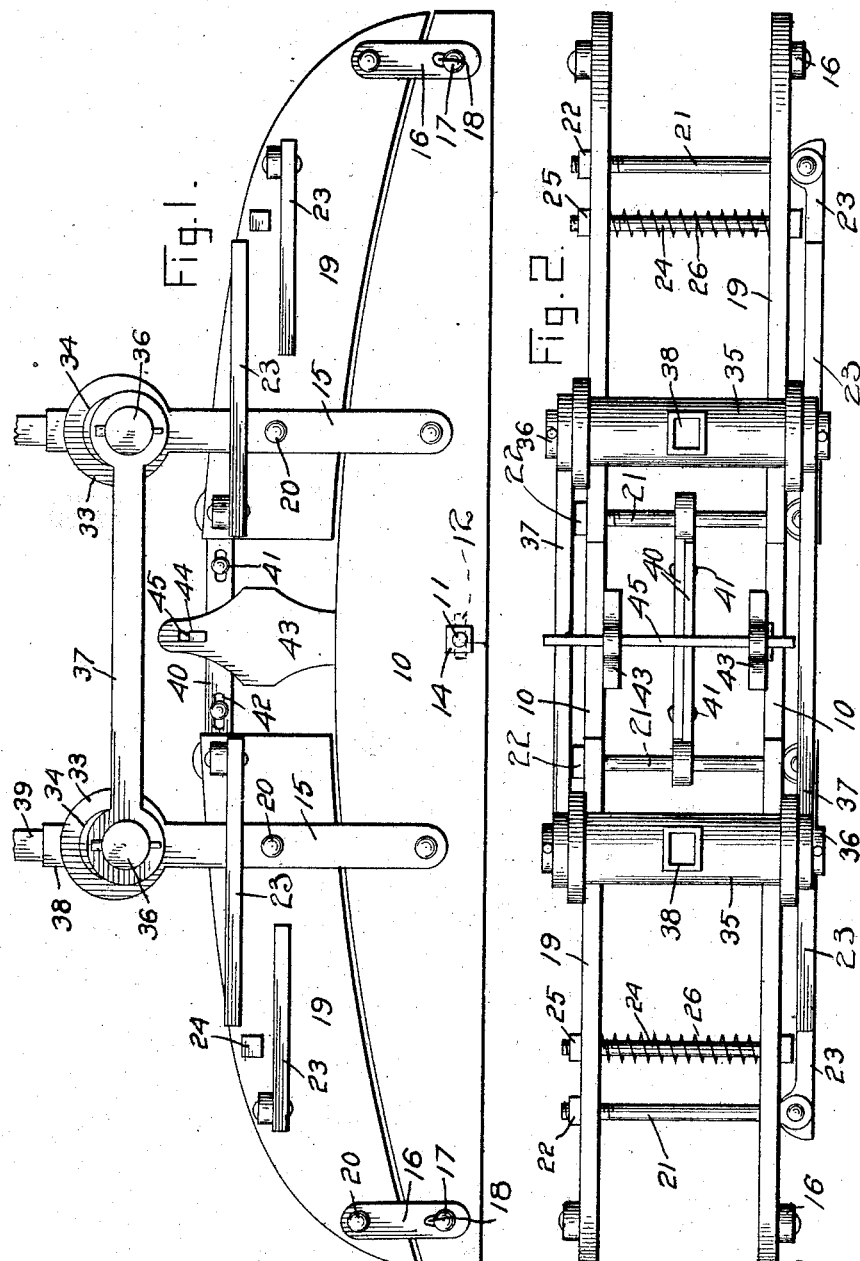

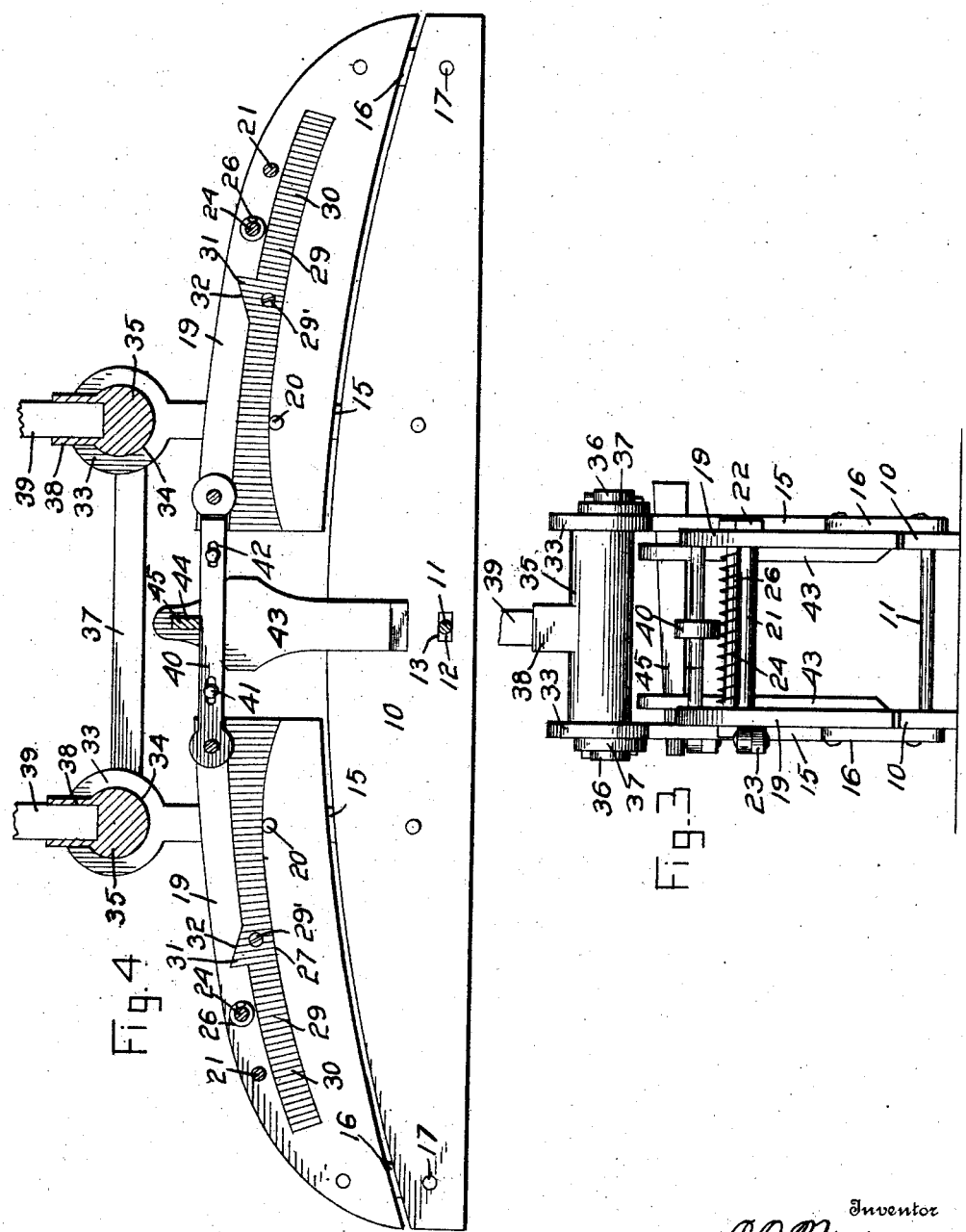

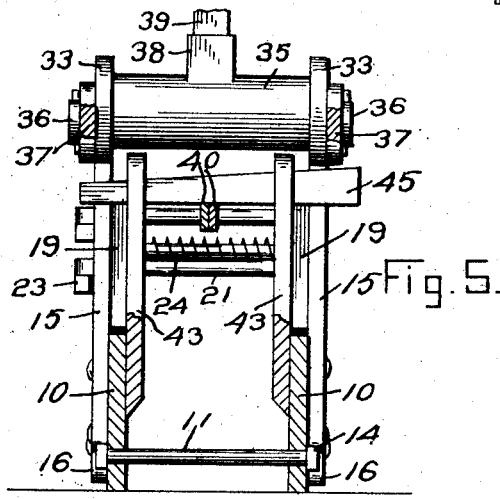
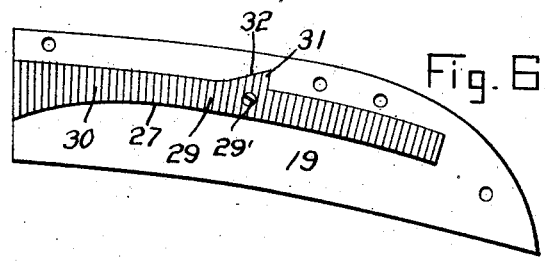
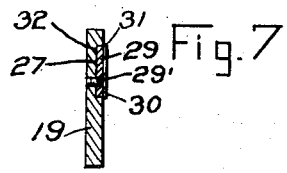

CHARLES OSCAR PEARCE, OF CHENEYVILLE, LOUISIANA.

TIRE-SETTER.

No. 883,666.   Specification of Letters Patent.   Patented March 31, 1908.

Application filed January 29, 1907. Serial No. 354,657.

*To all whom it may concern:*

Be it known that I, CHARLES OSCAR PEARCE, a citizen of the United States, residing at Cheneyville, in the parish of Rapides, State of Louisiana, have invented certain new and useful Improvements in Tire-Setters; and I do hereby declare the following to be a full, clear, and exact description of the invention, such as will enable others skilled in the art to which it appertains to make and use the same.

This invention relates to tire setters and more particularly to that class which are designed to set a tire while cold and the primary object of the invention is to provide a device of this class which may be quickly and easily operated to produce the results stated.

In addition to the provision of a novel means for adjusting the mechanism to a wheel, and the means for tightening or setting the tire after the mechanism has been so adjusted, there is disclosed in my invention a novel tire gripping member. This member comprises a strip of metal preferably hardened steel, which is seated in a recess formed in one of the cheek pieces, between which the tire is to be gripped and this strip is wider or is in other words flared at that end which rests in the open end of the recess in the cheek piece so that any tendency toward slipping of the strip while the mechanism is in use, will be overcome. For the same purpose a lug or shoulder is formed upon the upper edge of each strip and extends into a secondary recess in the cheek piece which recess communicates with the main recess in which the gripping strip is seated.

In the accompanying drawings, Figure 1 is a side elevation of my device in use, Fig. 2 is a top plan view thereof, Fig. 3 is an end elevation thereof, Fig. 4 is a detail vertical longitudinal sectional view therethrough, Fig. 5 is a detail vertical transverse sectional view taken through the middle of the device, Fig. 6 is a detail side elevation of one of the tire gripping cheek pieces, and, Fig. 7 is a detail vertical transverse sectional view therethrough.

Referring more specifically to the drawings the mechanism embodied in my invention is shown as comprising a pair of plates 10 which have their lower or under edges straight and their upper edges curved as clearly shown in Fig. 1 of the drawings. These plates are connected directly with each other by means of a bolt 11 which has its shank adjacent its head flattened and squared as at 12 and engaged in a rectangular opening 13 formed through one of the plates 10. The opposite end of the bolt is threaded and upon the same is engaged a nut 14.

Pivoted upon opposite sides of the middle of each plate and upon the outer face thereof are arms 15 and connected with the said plates at their ends are links 16 the connection being had by means of a pin 17 which is engaged through a slot 18 formed in each link.

Cheek pieces 19 are supported in planes directly above the end portions of the plates 10 by means of rivets or the like 20 which are engaged through the said cheek pieces, and the links 16 and the cheek pieces and the arms 15. It will be understood from the foregoing that there is a pair of these cheek pieces at each side of the device and that the said cheek pieces may have a movement to or from each other. Now in order to directly connect the cheek pieces of each pair I have provided bolts 21 which are engaged through the said cheek pieces, are threaded at one of their ends for engagement thereon of nuts 22 and have pivoted to their opposite ends cam levers 23 it being understood that the nuts 22 bear against the outer faces of the corresponding cheek pieces of the pairs at one side of the device and that the cam levers 23 bear at the outer faces of the other corresponding cheek pieces. It will also be understood that by swinging the cam levers 23 in one direction the cheek pieces 19 will be moved toward each other as will also the plates 10. In order that the cheek pieces and plates 10 may be held as far apart from each other as the adjustment of the nuts 22 will permit, I have provided bolts 24 which are headed at one of their ends and are engaged through the cheek pieces of each pair at a point between the bolts 21 and are provided at their ends opposite their headed ends with nuts 25 whereby the tension of springs 26 which are disposed upon the bolts between the cheek pieces, may be varied.

Each of the cheek pieces 19 is provided with a recess 27 and in this recess is seated, so as to project partially beyond the face of the cheek piece in which the recess is formed, is a strip 29 which is provided upon its outer face with serrations 30 and the serrations upon the strips 29 of each pair of cheek pieces are directed in opposition to the serrations upon the other pair so that the tire being set, may be firmly gripped. The recess 27 is enlarged or widened in each of the cheek pieces at the end thereof which opposes the end of the corresponding cheek piece of the other pair and the strips 29 are also widened accordingly and it will be understood from this that the force exerted upon the serrated strip 29 is in the direction of the opposite end of the cheek pieces to that just mentioned and that hence such force will only serve to tighten the position of the strips in their respective recesses. In carrying out this feature I also provide upon the upper edge of each strip 29 a lug or shoulder 31 which is presented in the direction of the line of force exerted upon the strip and projects into a secondary recess 32 formed in the respective cheek piece and in communication with the main recess 27 therein.

The means for moving the cheek pieces toward each other will now be described. The upper end of each arm 15 is enlarged as at 33 and the said enlarged portions are provided with openings 34, the openings in the arms of each pair being in alinement. Cylindrical shafts 35 are arranged for turning movement adjacent their ends in the openings 34 of each pair of arms and the said shafts are provided at their ends with reduced eccentric portions 36 which are engaged through openings formed in the ends of rods 37. Formed upon each of the shafts 35 is a socket 38 in which is adapted to be engaged a hand-bar 39.

From the foregoing it will be observed that by turning the shafts 5, the cheek pieces will be drawn toward each other and the tire properly tightened.

In order to prevent the tire from springing up I connect to each of the intermediate bolts 21 a link member 40 and connect these link members with each other by means of pins 41 which are engaged through slots 42 in one member and are carried by the other member and I connect with the plates 10 in a similar manner, arms 43 which project directly upwardly and upon opposite sides of the connected link members 40 as will be readily understood and through slots 44 formed in these arms 43 there is engaged a wedge key 45 which may be positioned so as to bear upon the upper edges of the connecting link members it being understood of course that these members bear upon the tire being set.

As shown in the drawings the serrated strips 29 are detachably held in the recesses 27 in respective cheek piece by means of screws 29 so that, if desired, a new strip may be substituted or an old strip removed and sharpened.

What is claimed is,—

1. A tire setting machine comprising a pair of connected plates having curved upper edges, cheek pieces loosely supported above the curved upper edges of the plates, said cheek pieces being arranged for movement to and from each other, bolts engaged through the cheek pieces and connecting the same, cam levers pivoted one to one end of each of the bolts and adapted to have positive engagement at times with the adjacent cheek pieces, bolts engaged through the cheek pieces, springs engaged upon the bolts and bearing at their ends against the inner faces of the cheek pieces to exert a normal tendency upon the cheek pieces toward separation, recesses formed in the inner faces of the cheek pieces and opening through the opposing ends of the same, serrated plates seated in the recesses and each widened toward one of its ends, the widened end of the plates being received in the widened portion of the recess in the corresponding cheek piece, and means whereby the cheek pieces may be moved toward each other in a longitudinal direction.

2. A tire setting machine comprising a pair of connected plates having curved upper edges, cheek pieces loosely supported above the curved upper edges of the plates, said cheek pieces being arranged for movement to and from each other, bolts engaged through the cheek pieces and connecting the same, cam levers pivoted one to one end of each of the bolts and adapted to have positive engagement at times with the adjacent cheek pieces, bolts engaged through the cheek pieces, springs engaged upon the bolts and bearing at their ends against the inner faces of the cheek pieces to exert a normal tendency upon the cheek pieces toward separation, recesses formed in the inner faces of the cheek pieces and widened each toward one end and opening through that end of the corresponding cheek piece which opposes the cheek piece at the corresponding side of the machine, the said recesses being provided with upwardly directed extensions, serrated plates seated in the recesses, each of said plates being widened toward one of its ends and having its widened end portions seated in the widened portion of the corresponding recess, an extension formed integral with each of the plates at the upper edge thereof and seated in the extended portion of the corresponding recess, and means whereby the cheek pieces may be moved toward each other in a longitudinal direction.

In testimony whereof, I affix my signature, in presence of two witnesses.

CHARLES OSCAR PEARCE.

Witnesses:
S. P. BLUM,
I. I. MURRAY.